US012473204B2

(12) United States Patent
Claverie et al.

(10) Patent No.: US 12,473,204 B2
(45) Date of Patent: Nov. 18, 2025

(54) PROCESS FOR MAKING SYNTHETIC MINERALS

(71) Applicants: IMERTECH SAS, Paris (FR); CENTRE NATIONAL DE LA RECHERCHE SCIENTIFIQUE (C.N.R.S.), Paris (FR); UNIVERSITÉ PAUL SABATIER TOULOUSE III, Toulouse (FR)

(72) Inventors: Marie Claverie, Hassegor (FR); Cyril Aymonier, Bégles (FR); Christel Careme, Mondouzil (FR); François Martin, Sainte Foy d'Aigrefeuille (FR); Christophe Le Roux, Avignonet Lauragais (FR); Mathilde Poirier, Toulouse (FR); Pierre Micoud, Peyssies (FR)

( * ) Notice: Subject to any disclaimer, the term of this patent is extended or adjusted under 35 U.S.C. 154(b) by 856 days.

(21) Appl. No.: 17/429,982

(22) PCT Filed: Feb. 11, 2020

(86) PCT No.: PCT/EP2020/053449
§ 371 (c)(1),
(2) Date: Aug. 11, 2021

(87) PCT Pub. No.: WO2020/165157
PCT Pub. Date: Aug. 20, 2020

(65) Prior Publication Data
US 2022/0098047 A1 Mar. 31, 2022

(30) Foreign Application Priority Data
Feb. 12, 2019 (EP) .................................... 19305176

(51) Int. Cl.
*C01B 33/22* (2006.01)
*C01G 17/00* (2006.01)

(52) U.S. Cl.
CPC ............ *C01B 33/22* (2013.01); *C01G 17/006* (2013.01); *C01P 2002/72* (2013.01);
(Continued)

(58) Field of Classification Search
CPC ... C01B 33/22; C01G 17/006; C01P 2002/72; C01P 2002/82; C01P 2004/03
See application file for complete search history.

(56) References Cited

U.S. PATENT DOCUMENTS 4,038,098 A * 7/1977 Wason .................... C01B 33/24
106/483
9,884,769 B2 * 2/2018 Le Roux ................. C01B 33/38
(Continued)

FOREIGN PATENT DOCUMENTS

KR 20190125857 A 11/2019

OTHER PUBLICATIONS

Claverie, Marie, et al. "Synthetic Talc and Talc-Like Structures: Preparation, Features and Applications." Chemistry—A European Journal 24.3 (2018): 519-542.*
(Continued)

*Primary Examiner* — Richard M Rump
(74) *Attorney, Agent, or Firm* — Finnegan, Henderson Farabow, Garrett & Dunner, LLP

(57) ABSTRACT

Methods for making a synthetic mineral and methods for making synthetic mineral precursors and the products of said methods.

19 Claims, 3 Drawing Sheets

(52) U.S. Cl.
CPC ...... *C01P 2002/82* (2013.01); *C01P 2002/86* (2013.01); *C01P 2004/03* (2013.01)

(56) References Cited

U.S. PATENT DOCUMENTS

| | | | |
|---|---|---|---|
| 2013/0343980 A1* | 12/2013 | Le Roux | ............... C01B 33/38 423/326 |
| 2014/0205528 A1 | 7/2014 | Le Roux et al. | |
| 2017/0066655 A1 | 3/2017 | Aymonier et al. | |

OTHER PUBLICATIONS

Petit, S., D. Righi, and Alain Decarreau. "Transformation of synthetic Zn-stevensite to Zn-talc induced by the Hofmann-Klemen effect." Clays and Clay Minerals 56.6 (2008): 645-654.*
Voisin, Thomas, et al. "Solubility of inorganic salts in sub-and supercritical hydrothermal environment: Application to SCWO processes." The Journal of supercritical fluids 120 (2017): 18-31.*
International Search Report and Written Opinion mailed Mar. 6, 2020, in International Application No. PCT/EP2020/053449.
Murotani, Hiroshi, Studies on Activated Magnesium Silicates, Journal of the Japan Society for Salt Science, 11, 2, 1957, 97-101.

* cited by examiner

PROCESS FOR MAKING SYNTHETIC MINERALS

CLAIM FOR PRIORITY

This application is a U.S. national phase entry under 35 U.S.C. § 371 from PCT International Application No. PCT/EP2020/053449, filed Feb. 11, 2020 which claims the benefit of priority of European Patent Application No. 19305176.0, filed Feb. 12, 2019, from both of which this application claims priority and both of which are incorporated herein by reference.

TECHNICAL FIELD

The present invention relates generally to methods for making a synthetic mineral, for example a synthetic phyllosilicate such as synthetic talc. The present invention further relates to the products and intermediate products of said methods and the various uses of said products.

BACKGROUND

Mineral particles, including silicates such as, germanates, silico-germanates and germano-silicates, may be used for a wide variety of applications in various industrial fields. For example, mineral particles may be used in thermoplastics, elastomers, paper, paint, varnish, textiles, metallurgy, pharmacy, cosmetics, fertilizers and more. The mineral particles may be used as an inert filler (e.g. to dilute other, more expensive, active components in a composition) or as a functional filler to provide one or more advantageous properties (e.g. to reinforce the mechanical properties of a material). Silicates may be obtained from natural sources and then ground to make the silicate products that are used for various industrial applications. However, naturally obtained silicate products may include a certain level of impurities. Further, naturally obtained silicates may need to undergo multiple processing steps in order to obtain a desired particle size distribution. In contrast, synthetic silicate and germanate particles generally have a higher level of purity and a narrower particle size distribution than the corresponding natural products. It is therefore desirable to provide alternative and/or improved methods for making synthetic mineral particles including silicon and/or germanium.

SUMMARY

In accordance with a first aspect of the present invention there is provided a method for making a synthetic mineral, the method comprising making a synthetic mineral precursor by a precipitation reaction between
  a metal silicate and/or germanate, and
  a divalent or trivalent metal salt,
  wherein the precipitation reaction does not include addition of an acid or a hydroxide base reagent to chemically equilibrate the precipitation reaction.

In accordance with an alternative aspect of the present invention there is provided a method for making a synthetic mineral, the method comprising making a synthetic mineral precursor by a precipitation reaction between
  a metal silicate and/or germanate, and
  a divalent or trivalent metal salt,
  wherein the molar ratio of metal atoms to silicon and/or germanium atoms in the metal silicate and/or germanate is less than about 2.

In accordance with a further alternative aspect of the present invention there is provided a method for making a synthetic mineral, the method comprising making a synthetic mineral precursor by a precipitation reaction between a metal metasilicate and/or metagermanate and a divalent or trivalent metal salt followed by a thermal treatment of the synthetic mineral precursor under supercritical conditions.

In accordance with a further alternative aspect of the present invention there is provided a method for making a synthetic mineral, the method comprising making a synthetic mineral precursor by a precipitation reaction between
  a metal silicate and/or germanate, and
  a divalent or trivalent metal salt,
  wherein the metal silicate and/or germanate comprises a metal disilicate and/or digermanate with a metal metasilicate and/or metagermanate. In certain embodiments, the metal silicate and/or germanate comprises a metal disilicate and a metal metasilicate.

In accordance with a second aspect of the present invention there is provided a method for making a synthetic mineral precursor, the method comprising a precipitation reaction between
  a metal silicate and/or germanate, and
  a divalent or trivalent metal salt,
  wherein the precipitation reaction does not include addition of an acid or a hydroxide base reagent to chemically equilibrate the precipitation reaction; or
  wherein the molar ratio of metal atoms to silicon and/or germanium atoms in the metal silicate and/or germanate is less than about 2; or
  wherein the metal silicate and/or germanate is a metal metasilicate and/or metagermanate and the precipitation reaction is followed by a thermal treatment of the synthetic mineral precursor under supercritical conditions; or
  wherein the metal silicate and/or germanate comprises a metal disilicate and/or digermanate with a metal metasilicate and/or metagermanate.

In accordance with a third aspect of the present invention there is provided a method for making a synthetic mineral, the method comprising thermal treatment of a synthetic mineral precursor according to or made according to any aspect or embodiment of the present invention.

In accordance with a fourth aspect of the present invention there is provided a synthetic mineral obtained by and/or obtainable by the method of any aspect or embodiment of the present invention.

In accordance with a fifth aspect of the present invention there is provided a synthetic mineral precursor obtained by and/or obtainable by the method of any aspect or embodiment of the present invention.

In certain embodiments, the synthetic mineral or synthetic mineral precursor is respectively a synthetic silicate or synthetic silicate precursor. In certain embodiments, the synthetic mineral or synthetic mineral precursor is respectively a synthetic phyllosilicate or synthetic phyllosilicate precursor. In certain embodiments, the synthetic phyllosilicate or synthetic phyllosilicate precursor is respectively synthetic talc or a synthetic talc precursor.

In certain embodiments, the metal silicate and/or germanate is a sodium silicate, for example sodium disilicate and/or sodium metasilicate.

In certain embodiments, the metal silicate and/or germanate is a combination of disilicate and/or digermanate with metasilicate/metagermanate in proportions sufficient to provide an equilibrated precipitation reaction without the external addition of an acid or a hydroxide base reagent and/or without producing an acid or a base as a product of the precipitation reaction.

In certain embodiments, the divalent or trivalent metal salt is a magnesium salt and/or a zinc salt. In certain embodiments, the divalent or trivalent metal salt is an acetate salt or sulphate salt.

In certain embodiments, the synthetic mineral precursor undergoes a thermal treatment process, for example a hydrothermal treatment process, in order to make the synthetic mineral. In certain embodiments, the thermal treatment process takes place under supercritical conditions. In certain embodiments, the metal silicate and/or germanate is a metasilicate and the thermal treatment process takes place under supercritical conditions.

In certain embodiments, the precipitation reaction takes place in the presence of a metal carboxylate salt of formula R—COOM', wherein R is selected from hydrogen (—H) and alkyl groups comprising less than 5 carbon atoms and M' is a monovalent metal. In certain embodiments, the metal carboxylate salt is a monovalent metal salt such as a sodium or potassium salt. In certain embodiments, the metal carboxylate salt is an acetate salt.

Certain embodiments of any aspect of the present invention may provide one or more of the following advantages:
  less reactants required;
  cheaper reactants used;
  more economical/environmentally-friendly process;
  synthetic products have high purity;
  synthetic products have high crystallinity;
  synthetic products have high lamellarity;
  desired particle size distribution;
  no production of an acid and/or base as a product of the precipitation reaction.

The details, examples and preferences provided in relation to any particulate one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION

Figure 1:
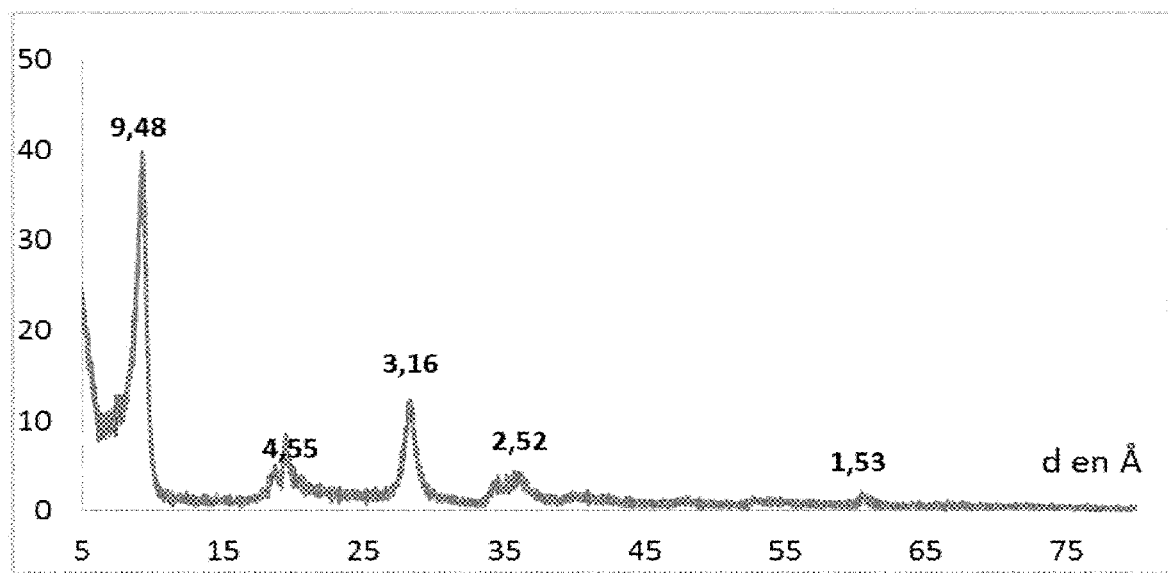
FIGS. 1 and 2 show the X-Ray diffractograms of synthetic talc made by the method of Example 1 (24 hours treatment and 6 hours treatment respectively).
Figure 2:
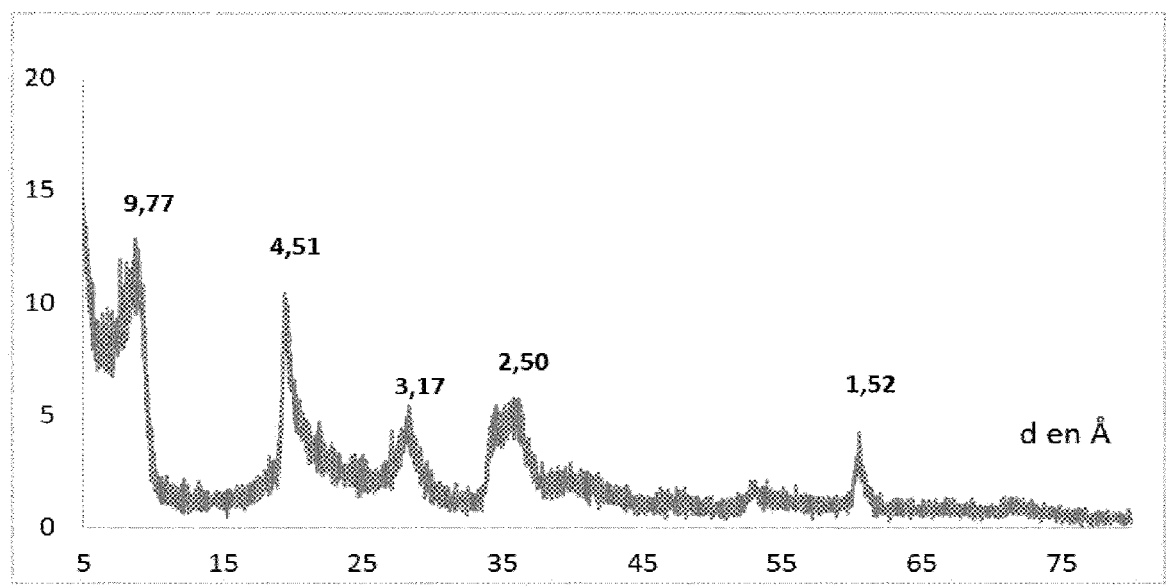
Figure 3:
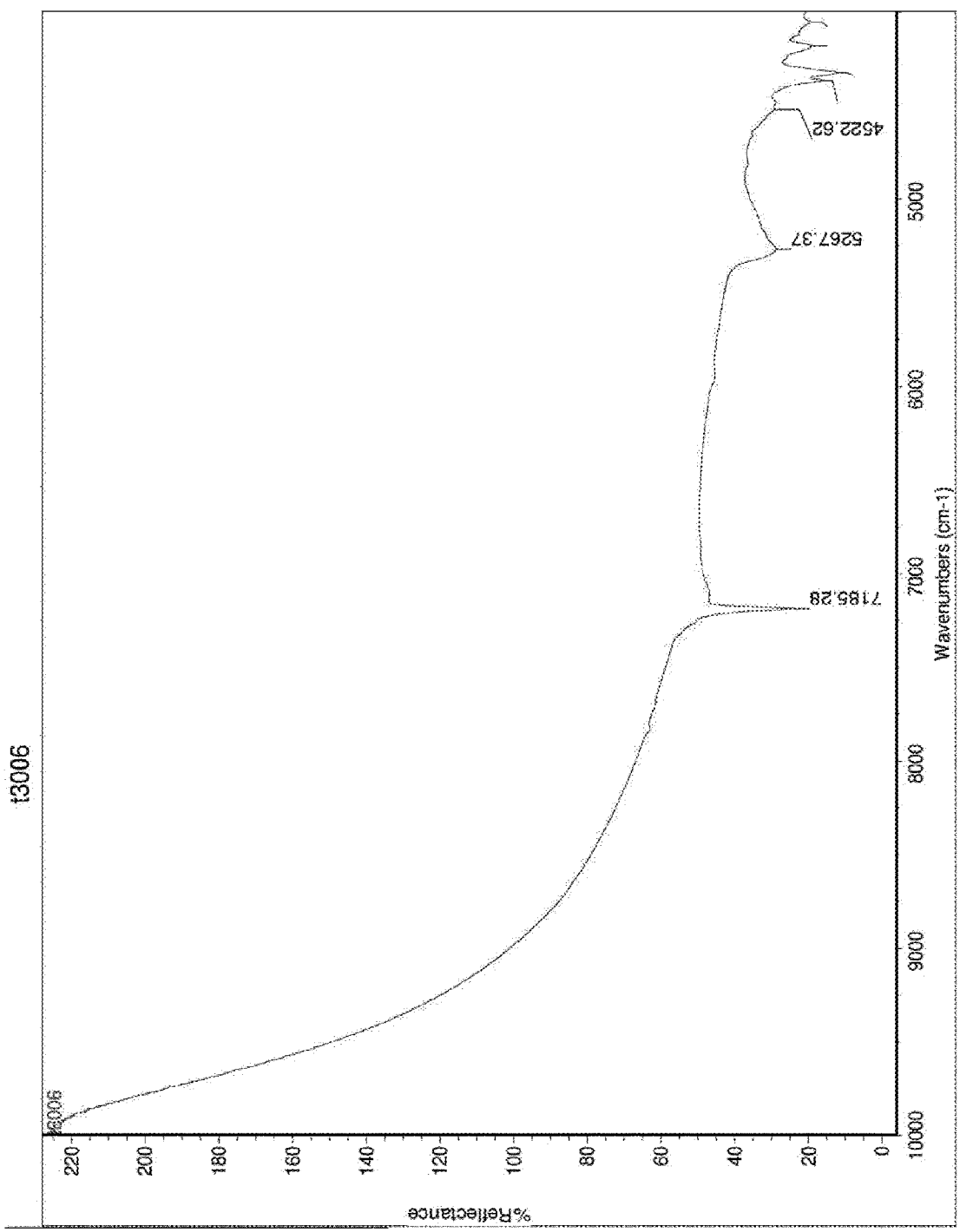
FIG. 3 shows the Infra-red spectrum of synthetic talc made by the method of Example 1 (6 hours treatment).
Figure 4:
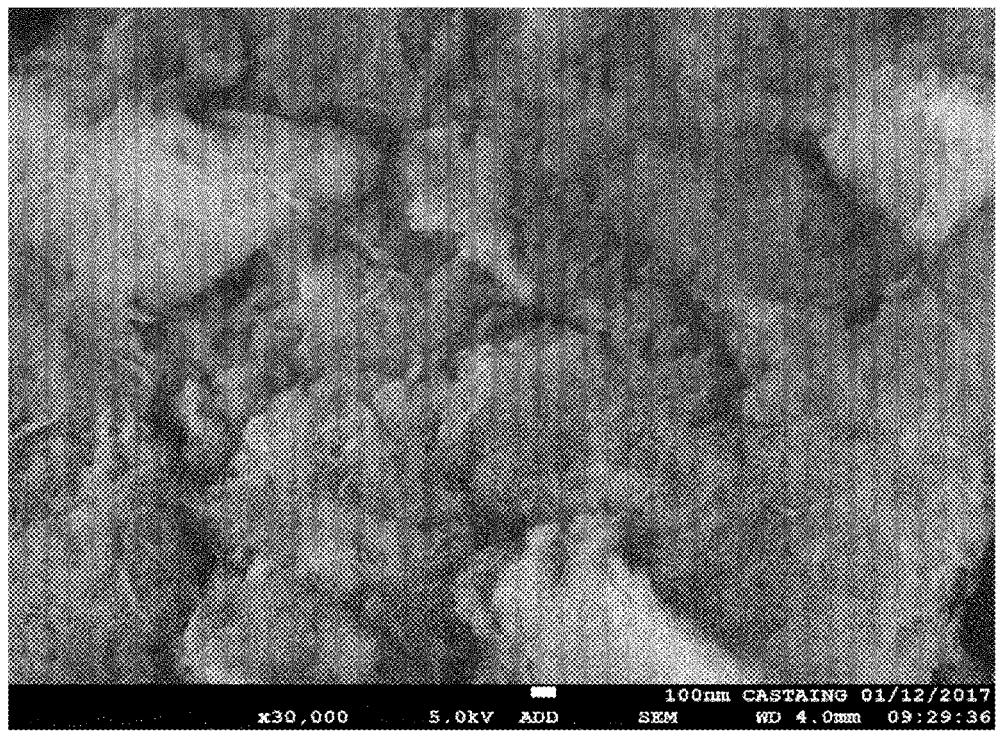
FIG. 4 shows an electron micrograph photograph of synthetic talc made by the method of Example 1 (6 hours treatment).

There is provided herein a method for making a synthetic mineral. The method comprises making a synthetic mineral precursor by a precipitation reaction between one or more metal silicate(s) and/or germanate(s) and one or more divalent or trivalent metal salt(s).

It has been surprisingly and advantageously found that a synthetic mineral can be made without the external addition of any reagents, in particular acid reagents (e.g. acetic acid) or hydroxide base reagents, to the precipitation reaction mixture, which may previously have been used to chemically equilibrate the precipitation reaction. It has further been surprisingly and advantageously found that, in certain embodiments, a synthetic mineral can be made without the production of an acid or base as a product of the precipitation reaction. This may, for example, be a result of the lack of addition of external acid or hydroxide base reagents to the precipitation reaction. In particular, in certain embodiments the one or more metal silicate(s) and/or germanate(s) comprises, consists essentially of or consists of a metal metasilicate and/or metal metagermanate and the method further comprises hydrothermal treatment under supercritical conditions.

It has further been surprisingly and advantageously found that a synthetic mineral can be made using a metal silicate and/or germanate that has a molar ratio of metal atoms to silicon and/or germanium atoms in the metal silicate and/or germanate is less than about 2. Thus, in certain embodiments, the one or more metal silicate(s) and/or germanate(s) comprises, consists essentially of or consists of metal disilicate and/or digermanate. For example, the one or more metal silicate(s) and/or germanate(s) may comprise, consist essentially of or consist of a metal disilicate.

It has further been surprisingly and advantageously found that a synthetic mineral can be made using a combination of a disilicate(s) and/or digermanate(s) with metasilicate(s) and/or metagermanate(s). Thus, in certain embodiments, the one or more metal silicate(s) and/or germanate(s) comprises, consists essentially of or consists of a combination of one or more disilicate(s) and/or digermanate(s) and one or more metasilicate(s) and/or metagermanate(s). For example, the one or more metal silicate(s) and/or germanate(s) comprises, consists essentially of or consists of a combination of disilicate and metasilicate.

In certain embodiments, the precipitation reaction does not include addition of an acid or a hydroxide base reagent to chemically equilibrate the precipitation reaction. In certain embodiments, the precipitation reaction does not include addition of an acid or a hydroxide base, whether to equilibrate the precipitation reaction or not. In certain embodiments, the precipitation reaction does not include addition of any reagent to chemically equilibrate the precipitation reaction. Alternatively or additionally, in certain embodiments, the molar ratio of metal atoms to silicon and/or germanium atoms in the metal silicate and/or germanate is less than about 2. Alternatively or additionally, in certain embodiments, the metal silicate and/or germanate comprises metal disilicate and metal metasilicate, for example in relative proportions sufficient to obtain an equilibrated precipitation reaction without the external addition of a hydroxide reagent and/or without the production of an acid or a base as a product of the precipitation reaction. In certain embodiments, the methods described herein do not form an acid or a base as a product of the precipitation reaction.

The synthetic mineral made by the methods described herein may be a synthetic silicate, a synthetic germanate or any other synthetic mineral containing silicon and/or germanium including silico-germanates and germano-silicates. The term germano-silicate refers to a silicate in which less than 50% of the silicon is substituted by germanium. The term silico-germanate refers to a germanate in which less than 50% of the germanium is substituted by silicon.

The term germanate refers to a material comprising germanate groups (anionic groups containing germanium). The term silicate refers to a material comprising silicate groups (anionic groups containing silicon). The silicate may, for example, be a phyllosilicate. The silicate and/or germanate may, for example, have a trigonal, orthorhombic, monoclinic, triclinic, hexagonal, tetragonal or cubic crystal structure. For example, the silicate may be willemite. Germanium may, for example, partially or fully replace silicon in silicate minerals and germanate minerals, silico-germanate and germano-silicate minerals may therefore have crystal structures corresponding to traditional silicate crystal structures.

The term phyllosilicate refers to a material comprising silicate groups (anionic groups containing silicon) and having a crystalline structure comprising at least one tetrahedral layer and at least one octahedral layer. The number of layers may vary from a few units to several thousand units. The phyllosilicate may, for example, be a 2:1 phyllosilicate wherein two tetrahedral layers are located on either side of an octahedral layer.

The synthetic phyllosilicate or synthetic phyllosilicate precursor may, for example, be selected from synthetic talc, synthetic pyrophyllites, synthetic micas, synthetic smectites (e.g. bentonite, montmorillonite, nontronite, beidellite, saponite), synthetic kaolinites, synthetic serpentines, synthetic chlorites and mixtures of one or more thereof. In certain embodiments, the synthetic phyllosilicate or synthetic phyllosilicate precursor is synthetic talc (a hydroxylated magnesium silicate of formula $Mg_3Si_4O_{10}(OH)_2$). The present invention may tend to be discussed in terms of synthetic talc. However, the invention should not be construed as being limited as such.

The synthetic silicate and/or synthetic germanate (e.g. synthetic phyllosilicate) may, for example be non-swelling. This refers to materials whose (001) diffraction line is not affected by a treatment by placing in contact with ethylene glycol or glycol, i.e. whose interatomic distance corresponding to the (001) (x-ray) diffraction line does not increase after it has been placed in contact with ethylene glycol or glycol. 2:1 phyllosilicates with the exception of smectites are non-swelling, including, for example, talc and micas such as muscovite.

The metal silicate and/or germanate comprises silicate and/or germanate. A metal silicate is a compound comprising a metal cation and an anion including silicon, for example an oxyanion such as orthosilicate ($SiO_4^{4-}$), $[SiO_{2+n}]^{2n-}$, $\{[SiO_3]^{2-}\}_n$ or $\{[SiO_{2.5}]^-\}_n$. A metal germanate is a compound comprising a metal cation and an anion including germanium, for example an oxyanion such as orthogermanate ($GeO_4^{4-}$). In certain embodiments, the metal silicate and/or germanate is a metal silicate. In certain embodiments, the metal silicate and/or germanate is a metal germanate. In certain embodiments, the metal silicate and/or germanate is a mixture of a metal silicate and a metal germanate. The present invention may tend to be discussed in terms of metal silicate, particularly metal disilicate and/or metal metasilicate. In certain embodiments, the metal silicate and/or germanate is a mixture of metal metasilicate and metal disilicate. However, the invention should not be construed as being limited as such.

The molar ratio of metal atoms to silicon and/or germanium atoms in the metal silicate and/or germanate may, for example, be less than about 2. For example, the molar ratio of metal atoms to silicon and/or germanium atoms in the metal silicate and/or germanate may, for example, be equal to or less than about 1.5 or equal to or less than about 1. For example, the molar ratio of metal atoms to silicon and/or germanium atoms in the metal silicate and/or germanate may, for example, be greater than 0, for example equal to or greater than about 0.5. For example, the molar ratio of metal atoms to silicon and/or germanium atoms in the metal silicate and/or germanate may be about 1 (e.g. wherein the metal silicate and/or germanate is sodium disilicate, $Na_2Si_2O_5$).

The metal silicate and/or germanate may, for example, be a metal monosilicate and/or monogermanate or a metal disilicate and/or digermanate. Metal monosilicates include, for example, sodium metasilicate ($Na_2SiO_3$), sodium metasilicate pentahydrate ($Na_2SiO_3.5H_2O$ or $Na_2SiO_2(OH)_2.4H_2O$), sodium metasilicate hexahydrate ($Na_2SiO_3.6H_2O$), sodium metasilicate octahydrate ($Na_2SiO_3.8H_2O$) or sodium metasilicate nonahydrate ($Na_2SiO_3.9H_2O$ or $Na_2SiO_2(OH)_2.8H_2O$). Metal disilicates include, for example sodium disilicate ($Na_2Si_2O_6.xH_2O$, for example wherein x is close to or equal to about 1). In certain embodiments, the metal silicate and/or germanate is not a metal monosilicate and/or is not a metal monogermanate. In certain embodiments, the metal silicate and/or germanate is not a metal metasilicate or is not sodium metasilicate. In certain embodiments, the metal silicate and/or germanate is not a metal metagermanate.

In certain embodiments, the metal silicate and/or germanate is a metal disilicate and/or digermanate. In certain embodiments, the metal silicate and/or germanate is a metal disilicate such as sodium disilicate and/or potassium disilicate. The metal silicate and/or germanate may or may not be hydrated. For example, the metal silicate and/or germanate may be a pentahydrate, a hexahydrate, an octahydrate or a nonahydrate.

The metal silicate and/or germanate may, for example, be a monovalent metal silicate and/or germanate such as a sodium silicate and/or germanate or a potassium silicate and/or germanate. The metal silicate and/or germanate may, for example, be potassium metasilicate ($K_2SiO_3$), hydrate or non-hydrate. The sodium silicate and/or potassium silicate may, for example, be in aqueous solution.

In certain embodiments, the metal silicate and/or germanate is a metal metasilicate and/or a metal disilicate. In certain embodiments, the metal silicate and/or germanate is sodium metasilicate and/or sodium disilicate.

The divalent or trivalent metal salt used in the precipitation reaction may, for example, comprise any divalent or trivalent metal. For example, the divalent or trivalent metal salt may comprise beryllium, magnesium, calcium, strontium, barium, radium, aluminium, gallium, indium, thallium, cobalt, zinc, copper, manganese, iron, nickel, chromium or a combination of one or more thereof. The present invention may tend to be described in terms of a divalent metal salt, particularly a magnesium salt or a zinc salt. However, the invention should not be construed as being limited as such.

The divalent or trivalent metal salt may, for example, not be a silicate and/or may not be a germanate salt. The divalent or trivalent metal salt may, for example, be a carboxylate salt (e.g. an acetate salt), a nitrate salt, a nitrite salt, a sulphate salt, a sulphide salt, a sulphite salt, a bisulphate salt, a bisulfite salt, a halide salt, a carbonate salt, a bicarbonate salt, a chlorate salt, a chromate salt, a dichromate salt, a phosphate salt, a hydroxide salt, a thiosulphate salt, a perchlorate salt or a combination thereof. In certain embodiments, the divalent or trivalent metal salt may be a carboxylate salt (e.g. an acetate salt) or a sulphate salt. In certain embodiments, the divalent or trivalent metal salt is magnesium acetate or magnesium sulphate.

In certain embodiments, the divalent or trivalent metal salt may be a hydrate.

In certain embodiments, the metal silicate and/or germanate is a disilicate such as sodium disilicate and the divalent or trivalent metal salt is an acetate or sulphate such as magnesium acetate or magnesium sulphate.

The precipitation reaction may, for example, use one or more metal silicate(s) and/or germanate(s) and one or more divalent or trivalent metal salt(s). The precipitation reaction may, for example, use one or more metal silicate(s) and one or more divalent or trivalent metal salt(s). The precipitation reaction may, for example, use one metal silicate and/or germanate and/or one divalent or trivalent metal salt. In certain embodiments, the precipitation reaction uses a mixture of a metasilicate and a disilicate.

The precipitation reaction takes place by contacting the one or more metal silicate(s) and/or germanate(s) and the one or more divalent or trivalent metal salt(s). The metal silicate and/or germanate and the divalent or trivalent metal salt may be in any form suitable to carry out the precipitation reaction. For example, the metal silicate and/or germanate and the divalent or trivalent metal salt may each independently be in liquid form. For example, the metal silicate and/or germanate and divalent or trivalent metal salt may each independently be in solution and the solutions may be mixed together to start the precipitation reaction. The solvent in the solutions of metal silicate and/or germanate and the divalent or trivalent metal salt may, for example, be water, alcohols or a mixture of one or more thereof. Alcohols include, for example, linear or branched chain alcohols, for example comprising less than 10 or less than 7 carbon atoms, such as methanol, ethanol, propanol, isopropanol, butanol, pentanol, hexanol, propylene glycol and ethylene glycol. In certain embodiments, the solvent is water (in other words the metal silicate and/or germanate and the divalent or trivalent metal salt may each independently be in an aqueous solution).

The reaction medium and each starting composition may be at least partially hydrated (the hydrothermal treatment of this reaction medium then being termed more generally a solvothermal treatment). The liquid medium may, for example, be chosen from water, alcohols and mixtures thereof. For example, the alcohols may be chosen from linear or branched alcohols, comprising less than 10 carbon atoms, for example less than 7 carbon atoms, for example methanol, ethanol, propanol, isopropanol, butanol, pentanol, hexanol, propylene glycol and ethylene glycol. For example, the liquid medium of the starting composition and the liquid medium of the reaction medium may be prepared, for example, solely with water or alternatively with a mixture of water and at least one alcohol.

The precipitation reaction may, for example, take place at or around room temperature and pressure and/or atmospheric temperature and pressure. For example, at a temperature ranging from about 15° C. to about 30° C. or from about 15° C. to about 25° C. For example, at a pressure ranging from about 0.05 to about 0.5 MPa, for example from about 0.09 to about 0.2 MPa, for example about 0.1 MPa. Alternatively, the precipitation reaction may take place at a higher temperature and/or pressure to allow a more rapid dissolution of the salts in water, for example at a temperature ranging from about 50° C. to about 70° C. Alternatively, the precipitation reaction may occur immediately before the thermal treatment process described herein and therefore take place at a temperature and pressure appropriate for the thermal treatment process described herein. The metal silicate and/or germanate and the divalent or trivalent metal salt may be mixed, for example by manual stirring, magnetic stirring and/or ultrasound.

The concentration of each solution may, for example, each independently range from about $10^{-3}$ mol/L to about 10 mol/L, for example from about $10^{-2}$ mol/L to about 5 mol/L, for example from about $10^{-1}$ mol/L to about 4 mol/L, for example from 0.5 mol/L to about 3 mol/L.

The metal silicate and/or germanate and the divalent or trivalent metal salt may, for example, be combined in stoichiometric proportions to obtain the desired synthetic mineral (the ratio of metal silicate and/or germanate and the divalent or trivalent metal salt corresponds to the ratio of these elements in the desired synthetic mineral).

In previously described processes, an acid reagent such as acetic acid was added to the precipitation reaction to chemically equilibrate the reaction without the appearance of any base as a product of the precipitation reaction. However, it has surprisingly been found that a synthetic mineral can be made without the addition of a reagent, particularly an acid reagent or a hydroxide base reagent, to chemically equilibrate the precipitation reaction. Thus, in certain embodiments, neither an acid nor a hydroxide base reagent are added to the precipitation reaction in an amount or under conditions suitable to equilibrate the reaction. In certain embodiments, neither an acid nor a hydroxide base reagent are added to the precipitation reagents. In certain embodiments, no additional reagent(s) are added to the precipitation reaction in an amount or under conditions suitable to equilibrate the reaction. This means that an acid or a hydroxide base reagent is/are not added to the metal silicate and/or germanate and divalent or trivalent metal salt before or during the precipitation reaction. In certain embodiments, an acid or a hydroxide base reagent is/are not added to the metal silicate and/or germanate and divalent or trivalent metal salt after the precipitation reaction. In this context, additional reagent(s) does not include the metal silicate and/or germanate and the divalent or trivalent metal salt required for the precipitation reaction.

It also does not include the addition of a metal carboxylate salt of formula R—COOM' discussed herein, which may be added to accelerate synthesis of the synthetic mineral during the thermal treatment and/or provide a precursor having less aggregation between the particles and improved particle size. In this context, acid and base refers to Brønsted-Lowry definition of acids and bases, whereby an acid is a species that can lose a proton and a base is a species that can accept a proton. A hydroxide base reagent refers to any reagent that form a hydroxide when in the reaction medium for the precipitation reaction. For example, sodium alkoxides dissolve in water to give alcohol and NaOH and thus can be used as a hydroxide base to chemically equilibrate the precipitation reaction.

In certain embodiments, the metal silicate and/or germanate comprises a metal disilicate and/or digermanate. In certain embodiments, the metal silicate and/or germanate comprises a metal disilicate/digermanate and a metal metasilicate/metagermanate. The metal disilicate/digermanate and metal metasilicate/metagermanate may be used in combination without the external addition of an acid or a hydroxide base reagent, for example without the external addition of any additional reagent(s). Where a combination of metal disilicate and/or digermanate with a metal metasilicate and/or metagermanate is used, the disilicate and/or digermanate and metasilicate and/or metagermanate may be used in stoichiometric proportions required to obtain the desired synthetic mineral product for example without addition of an acid or a hydroxide base as reagent(s) of the precipitation reaction and/or without production of an acid or a hydroxide base as product(s) of the precipitation reaction. The precipitation reaction may, for example, be as follows:

$Na_2Si_2O_5 + 2\, Na_2SiO_3 + 3\, Mg(CH_3COO)_2 + n'H_2O \rightarrow Mg_3Si_4O_{11}, n'H_2O + 6\, (CH_3COO)Na$ In certain embodiment, the precipitation includes addition of or takes place in the presence of one or more metal carboxylate salts of formula R—COOM', wherein R is selected from hydrogen (—H) and alkyl groups comprising less than 5 carbon atoms and M' is a monovalent metal. This may act to accelerate the production of the synthetic mineral during the thermal treatment process. Alternatively or additionally, the thermal treatment described herein takes place in the presence of one or more metal carboxylate salts of formula R—COOM' as described herein. The one or more metal carboxylate salts of formula R—COOM' are used in addition to the source of metal for the precipitation reaction (the divalent or trivalent metal salt), which may, in certain embodiments, be a carboxylate salt. The metal carboxylate salts of formula R—COOM' do not provide a source of metal for the synthetic mineral.

In certain embodiments, R is methyl, ethyl, propyl, butyl or pentyl. In certain embodiments, R is methyl or ethyl. In certain embodiments, R is methyl (R—COO is acetate).

In certain embodiments, M' is a monovalent metal, for example sodium, potassium or a combination of one or more thereof. In certain embodiments, M' is sodium or potassium. In certain embodiments, M' is the same metal as in the metal silicate and/or germanate.

In certain embodiments, the metal carboxylate salt is sodium acetate or potassium acetate.

The metal carboxylate salt may, for example, be used in a concentration to allow a synthetic mineral to be obtained after a reduced duration of hydrothermal treatment. The metal carboxylate salts may, for example, be used in a concentration ranging from about 0.1 mol/L to about 10 mol/L, for example from about 0.2 mol/L to about 8 mol/L, for example from about 0.5 mol/L to about 6 mol/L, for example from about 1 mol/L to about 5 mol/L, for example from about 1 mol/L to about 4 mol/L.

The molar ratio of metal carboxylate salt to silicon and/or germanium may, for example, be from about 0.05 to about 25, for example from about 0.05 to about 20, for example from about 0.1 to about 15, for example from about 0.1 to about 10.

The precipitation reaction forms the synthetic mineral precursor. The synthetic mineral precursor includes silicon and/or germanium. The precursor may, for example, be a suspension, for example a white suspension or may, for example, be a hydrogel, for example having a formula $(Si_xGe_{1-x})_4M_3O_{11}$, n'H$_2$O where M is a metal, x' is a value between 0 and 1 (including 0 and 1), and n' is the number of water molecules associated with the gel.

The synthetic mineral precursor may, for example, be recovered, for example after centrifugation (e.g. 3000 to 15,000 rpm for 5 to 60 minutes) and removal of the supernatant, optionally washing with demineralized water and then drying (e.g. in an oven, for example at 60° C. for 2 days), by lyophilisation, by atomization or by microwave irradiation. The synthetic mineral precursor may therefore be stored in the form of a powder with a view to possible subsequent thermal treatment.

The synthetic mineral precursor is then treated to make synthetic mineral particles. The treatment may, for example, comprise a thermal treatment, for example a hydrothermal treatment, process. For example, the precipitation medium of the precipitation reaction may be subjected to a thermal treatment, for example a hydrothermal treatment, process in order to make the synthetic mineral. Where the precipitation reaction is carried out using solutions of the metal silicate and/or germanate and/or divalent or trivalent metal salt, the solvent (e.g. water) may be the precipitation reaction medium that is subjected to the thermal treatment process.

The methods described herein, for example the thermal treatment processes, may be carried out in batch or continuous processes. The methods described herein, for example the thermal treatment of the synthetic mineral precursor, may, for example, be carried out as described in US 2017/0066655, US 2014/0205528 or US 2013/0343980, the contents of which are incorporated herein by reference.

Continuous reactors suitable for the method described herein include, for example, constant-volume continuous reactors, such as, for example, piston reactors or reactors of piston-flow type, or still a reactor which can be modelled by a succession of stirred reactors. It may be the case, for example, of tubular reactors in which the flow of the reaction medium takes place under a laminar, turbulent or intermediate regime. In addition, it is possible to use any co-current or counter-current reactor as regards to the introduction and placing in contact of the various compositions and/or liquid media placed in contact in a method described herein. The injection can be also performed with T or Y injectors. The continuous reactors have at least one inlet suitable for allowing continuous introduction of reactants to a reaction zone and at least one outlet for the continuous removal of the synthetic mineral product. The thermal treatment may, for example, be carried out in an autoclave, for example an autoclave formed from a nickel-based alloy such as Hastelloy® (marketed by Haynes International, Kokomo, United States) or a autoclave made of titanium or optionally made of steel with an inner polytetrafluoroethylene (PTFE) lining in a case where the hydrothermal treatment temperature does not exceed 250° C. Such an autoclave may have any capacity, for example a capacity ranging from about 200 ml to about 50 litres. The thermal treatment may, for example, be carried out with mechanical stirring. The autoclave may therefore, for example, be equipped with an internal metal screw.

Any temperature suitable for forming the synthetic mineral as a function of the pressure and reaction time may be used. The thermal treatment process may, for example, take place at a temperature equal to or greater than about 100° C. For example, the thermal treatment process may take place at a temperature equal to or greater than about 120° C. or equal to or greater than about 140° C. or equal to or greater than about 150° C. or equal to or greater than about 160° C. or equal to or greater than about 170° C. or equal to or greater than about 180° C. or equal to or greater than about 190° C. or equal to or greater than about 200° C. or equal to or greater than about 210° C. or equal to or greater than about 220° C. or equal to or greater than about 230° C. or equal to or greater than about 240° C. or equal to or greater than about 250° C. or equal to or greater than about 260° C. or equal to or greater than about 270° C. or equal to or greater than about 280° C. or equal to or greater than about 290° C. or equal to or greater than about 300° C.

The thermal treatment process may, for example, take place at a temperature up to about 600° C. or up to about 590° C. or up to about 580° C. or up to about 570° C. or up to about 560° C. or up to about 550° C. or up to about 540° C. or up to about 530° C. or up to about 520° C. or up to about 510° C. or up to about 500° C. In certain embodiments, the temperature of the thermal treatment process ranges from about 150° C. to about 600° C. or from about 200° C. to about 400° C. or from about 200° C. to about 350° C. or from about 350° C. to about 450° C. or from about 250° C. to about 350° C.

Any pressure suitable for forming the synthetic mineral as a function of the temperature and reaction time may be used. The thermal treatment process may, for example, take place at a pressure equal to or greater than about 5 bar (0.5 MPa). For example, the thermal treatment process may take place at a pressure equal to or greater than about 10 bar (1 MPa) or equal to or greater than about 20 bar (2 MPa) or equal to or greater than about 30 bar (3 MPa) or equal to or greater than about 40 bar (4 MPa) or equal to or greater than about 50 bar (5 MPa). The thermal treatment process may, for example, take place at a pressure up to about 300 bar (30 MPa) or up to about 250 bar (25 MPa) or up to about 200 bar (20 MPa) or up to about 150 bar (15 MPa). The thermal treatment may, for example, be carried out under autogenous pressure, that is to say at a pressure that is at least equal to the saturation vapour pressure of water (pressure at which the vapour phase is in equilibrium with the liquid phase). The autogenous pressure reached in the autoclave during the thermal treatment therefore depends especially on the temperature at which said thermal treatment is carried out, on the volume of the autoclave and on the quantity of water present. It is likewise possible to carry out the hydrothermal treatment at a pressure greater than the saturation vapour pressure of water or greater than the autogenous pressure in the vessel in which the thermal treatment is taking place. To that end, a gas that is chemically neutral with respect to the thermal reaction can, for example, be injected into the autoclave or the vessel in which the hydrothermal treatment is taking place. Such a gas is chosen from the group formed of the inert gases (rare gases), in particular argon, nitrogen ($N_2$), carbon dioxide and air (compressed air). There may, for example, be added to the autoclave, a quantity of water (preferably distilled water) that is at least sufficient to create a saturation vapour pressure inside the autoclave brought to the treatment temperature.

The thermal treatment may, for example, be carried out with a synthetic mineral precursor that is liquefied and has a liquid/solid ratio of from 2 to 20, especially from 5 to 15 (the quantity of liquid being expressed in $cm^3$ and the quantity of solid in grams, and denoting the quantity of dry synthetic mineral precursor only, that is to say without taking into account the optional metal carboxylate salt(s). Optionally, if necessary, an appropriate quantity of water for achieving that ratio may be added to said liquefied synthetic mineral precursor.

The thermal treatment process may, for example, take place under subcritical or supercritical conditions. The thermal treatment process may, for example, take place under supercritical conditions for the reaction medium or liquid medium in which the reaction takes place. For example, the thermal treatment process may take place under supercritical conditions for water. For example, in the presence of an essentially or solely aqueous reaction medium, supercritical conditions are a temperature and pressure above the critical point of water (22.1 MPa and 374° C.). Thus, the thermal treatment process may, for example, take place at a temperature above about 375° C. and a pressure above about 22.3 MPa. In particular, the thermal treatment process may take place under supercritical conditions when the metal silicate and/or germanate includes or is a metasilicate and/or metagermanate such as sodium metasilicate and/or sodium metagermanate.

The thermal treatment process may, for example, take place for a period of time ranging from about 5 seconds to about 30 days. For example, the thermal treatment process may take place for a period of time ranging from about 1 minute to about 25 days or from about 5 minutes to about 20 days or from about 10 minutes to about 15 days or from about 1 hour to about 24 hours or from about 2 hours to about 12 hours or from about 4 hours to about 8 hours. For example, the thermal treatment process may take place for a period of time ranging from about 5 seconds to about 1 minute or from about 10 seconds to about 30 seconds. The thermal treatment process may, for example, take place for periods of time less than about 60 seconds when a continuous process is used and/or when supercritical conditions are used.

At the end of a thermal treatment of a synthetic mineral precursor there may be obtained a composition in the form of a colloidal solution containing mineral particles, for example having at least one non-swelling phase. These synthetic mineral particles in solution may be in a state such that the particles are well individualized relative to one another, with very few or no aggregate(s) of synthetic mineral particles. At the end of the thermal treatment there may be recovered a colloidal composition comprising synthetic mineral particles in suspension in an aqueous solution of metal carboxylate salt(s). Said colloidal composition can then be subjected to a drying step, after an optional step of washing with water in order to remove at least partially said metal carboxylate salt(s). Such a washing step may comprise at least one cycle of washing/centrifugation of said colloidal composition.

The synthetic silicate, for example synthetic phyllosilicate, obtained by the methods described herein may, for example, have in X-ray diffraction, at least one diffraction line characteristic of a plane (001) situated at a distance between 9.40 Ångstroms and 9.90 Ångstroms. The presence of such a diffraction line is characteristic of a product that is very similar to a natural talc. Furthermore, the synthetic silicate may not have, in X-ray diffraction, a diffraction line characteristic of a plane situated at a distance between 12.00 Angstroms and 18.00 Angstroms, conventionally indicating the residual presence of a swelling phase having interfoliar spaces in which interfoliar cations and possibly molecules of water are found. Furthermore, the synthetic silicate may have in X-ray diffraction, at least one diffraction line characteristic of a plane (002) situated at a distance between 4.60 Å and 4.80 Å.

The synthetic mineral may, for example, have in X-ray diffraction, a plane (113) located at a distance between about 2.75 Ångstroms and about 2.95 Ångstroms. Alternatively or additionally, the synthetic mineral may have in X-ray diffraction, a plane (110) between about 6.9 Ångstroms and about 7.1 Ångstroms and/or a plane (300) located at a distance between about 4.0 Ångstroms and about 4.2 Ångstroms and/or a plane (220) between about 3.4 Ångstroms and about 3.6 Ångstroms and/or a plane (410) between about 2.55 Ångstroms and about 2.75 Ångstroms and/or a plane (223) between about 2.2 Ångstroms and about 2.4 Ångstroms and/or a plane (333) between about 1.75 Ångstroms and about 1.95 Ångstroms.

The synthetic silicate may have in X-ray diffraction, the following characteristic diffraction peaks:
a plane (001) located at a distance between 9.50 Å and 10.25 Ångstroms;
a plane (020) located at a distance between 4.50 Å and 4.61 Ångstroms;
a plane (003) located at a distance between 3.10 Å and 3.20 Ångstroms;

a plane (060) located at a distance between 1.50 Å and 1.55 Ångstroms.

The synthetic phyllosilicate may have in X-ray diffraction, the following characteristic diffraction lines:

a plane (001) situated at a distance between 9.40 Å and 9.90 Ångstroms;

a plane (002) situated at a distance between 4.60 Å and 4.80 Ångstroms;

a plane (003) situated at a distance between 3.10 Å and 3.20 Ångstroms;

a plane (060) situated at a distance between 1.51 Å and 1.53 Ångstroms;

the intensity of the diffraction line characteristic of a plane (002) being greater than the intensity of the signal corresponding to a plane (020) situated at a distance between 4.40 Angstroms and 4.60 Angstroms, and the ratio between the intensity of the diffraction line characteristic of a plane (001) and the intensity of the diffraction line characteristic of a plane (003) being from 0.20 to 5, for example from about 0.20 to 4 or from about 0.20 to about 3 or from about 0.20 to about 2 or from about 0.20 to about 1.5.

In particular, in the case of a thermal treatment of long duration and/or is carried out at a sufficiently high temperature, and/or following an anhydrous heat treatment, it is possible that such a composition has, in X-ray diffraction, a diffraction line characteristic of a plane (002) situated at a distance between 4.60 Angstroms and 4.80 Angstroms that is of an intensity so much greater than that of the diffraction line representative of a plane (020) situated at a distance between 4.40 Angstroms and 4.60 Angstroms that the diffraction line representative of the plane (020) can be masked by the diffraction line characteristic of the plane (002).

In addition, a near-infrared spectrum of a synthetic silicate may have lines characteristic of the vibration bands of a natural talc. Advantageously and according to the invention, a composition according to the invention has, in near-infrared, a vibration band at 7185 $cm^{-1}$ representative of the vibration of the $Mg_3$—OH bond of talc. Furthermore, the near-infrared spectrum of the synthetic silicate may have a vibration band, situated between 5000 $cm^{-1}$ and 5500 $cm^{-1}$, characteristic of a synthetic talc composition and revealing the presence of molecules of water bonded to the talc at lamina edges. Accordingly, a synthetic talc may have, in near-infrared, a vibration band situated between 5000 $cm^{-1}$ and 5500 $cm^{-1}$, in particular between 5200 $cm^{-1}$ and 5280 $cm^{-1}$, corresponding to the presence of water bonded at lamina edges. The presence of such a vibration band, having high intensity, is capable of allowing a synthetic talc to be distinguished from a natural talc, the other infrared vibration bands of a synthetic talc and of a natural talc being similar.

The synthetic mineral may, for example, have a particle size from about 10 nm to about 900 nm, for example from about 10 nm to about 600 nm.

Following the treatment to form the synthetic mineral, the synthetic mineral product may be dried via any powder drying technique, for example by lyophilisation or by means of an oven, for example at a temperature ranging from about 60° C. to about 130° C. for 1 to 48 hours, under microwave irradiation, or by atomisation.

It is further possible to subject the composition comprising synthetic mineral particles that is obtained after thermal treatment to an anhydrous heat treatment, in air, at a temperature greater than about 350° C. and lower than the degradation temperature of the synthetic mineral particles. Advantageously and according to the invention, a composition comprising synthetic mineral particles that is obtained after thermal treatment is subjected to an anhydrous heat treatment at a temperature of from about 350° C. to about 850° C., in particular from about 400° C. to about 750° C. and in particular from about 450° C. to about 600° C., for example for a duration of from about 30 minutes to about 24 hours. After said hydrothermal treatment, said composition comprising synthetic mineral particles may be subjected to an anhydrous heat treatment. Such a heat treatment or "annealing" permits an additional increase in the crystallinity of the particles obtained.

EXAMPLES

Example 1

Synthesis of Talc Using Sodium Disilicate
(Si/Na=1)

22.2 g (0.1 mol) sodium disilicate hydrate was dissolved in 150 mL distilled water in a first beaker (A) under magnetic stirring and ultrasound. In a second beaker (B), 32.17 g (0.15 mol) magnesium acetate tetrahydrate was dissolved in 50 mL deionised water under magnetic stirring and ultrasound. The content of beaker (B) was rapidly added to the content of beaker (A) with manual stirring to obtain a white suspension. The obtained aqueous suspension was treated in a hydrothermal reactor for 24 hours or 6 hours at 300° C. under autogeneous pressure (85 bar). At the end of the hydrothermal treatment, a white gel was obtained, which was washed with distilled water several times. A white paste was obtained which may be dried in an oven at 120° C. during several hours. The solid obtained was crushed in an agate mortar to lead to a white powder which was subjected to analysis (InfraRed (IR), X-Ray Diffraction (XRD), Nuclear Magnetic Resonance (NMR), Field Emission Gun Scanning Electron Microscopy (FEG-SEM)). The results are shown in FIGS. 1 to 4 and demonstrate that the product of the reaction was synthetic talc. FIG. 1 relates to the synthetic talc made by the 24 hour treatment and FIGS. 2 to 4 relate to the synthetic talc made by the 6 hour treatment.

Example 2

Synthesis of Talc Using Sodium Disilicate
(Si/Na=1) with Sodium Acetate as Booster 22.2 g (0.1 mol) sodium disilicate hydrate was dissolved in 150 mL distilled water in a first beaker (A) under magnetic stirring and ultrasound. 60 g anhydrous sodium acetate was added. In a second beaker (B), 32.17 g (0.15 mol) magnesium acetate tetrahydrate was dissolved in 50 mL deionised water under magnetic stirring and ultrasound. The content of beaker (B) was rapidly added to the content of beaker (A) with manual stirring to obtain a white suspension. The obtained aqueous suspension was treated in a hydrothermal reactor for 6 hours at 300° C. under autogeneous pressure (85 bar). At the end of the hydrothermal treatment, a white gel was obtained, which was washed with distilled water several times. A white paste was obtained which may be dried in an oven at 120° C. during several hours. The solid obtained was crushed in an agate mortar to lead to a white powder which was subjected to analysis (IR, XRD, NMR, FEG-SEM). The results demonstrated that the product was synthetic talc.

Example 3

Synthesis of Talc Using Sodium Disilicate
(Si/Na=1) with Potassium Acetate as Booster 22.2 g (0.1 mol) sodium disilicate hydrate was dissolved in 150 mL distilled water in a first beaker (A) under magnetic stirring and ultrasound. 60 g anhydrous potassium acetate was added. In a second beaker (B), 32.17 g (0.15 mol) magnesium acetate tetrahydrate was dissolved in 50 mL deionised water under magnetic stirring and ultrasound. The content of beaker (B) was rapidly added to the content of beaker (A) with manual stirring to obtain a white suspension. The obtained aqueous suspension was treated in a hydrothermal reactor for 3 hours at 300° C. under autogeneous pressure (85 bar). At the end of the hydrothermal treatment, a white gel was obtained, which was washed with distilled water several times. A white paste was obtained which may be dried in an oven at 120° C. during several hours. The solid obtained was crushed in an agate mortar to lead to a white powder which was subjected to analysis (IR, XRD, NMR, FEG-SEM). The results demonstrated that the product was synthetic talc.

Example 4

Synthesis of Talc Using Aqueous Solution of Sodium Silicate ($Na_2O.x\ SiO_2$ with x=3.4); Aqueous Solution:Dry Matter 36%

21.7 g (0.1 mol) of aqueous solution of sodium silicate was mixed with 100 mL distilled water in a first beaker (A) under magnetic stirring and ultrasound. In a second beaker (B), 16.08 g (0.075 mol) magnesium acetate tetrahydrate was dissolved in 50 mL deionised water under magnetic stirring and ultrasound. The content of beaker (B) was rapidly added to the content of beaker (A) with manual stirring to obtain a white suspension. The obtained aqueous suspension was treated in a hydrothermal reactor for 24 hours at 300° C. under autogeneous pressure (85 bar). At the end of the hydrothermal treatment, a white gel was obtained, which was washed with distilled water several times. A white paste was obtained which may be dried in an oven at 120° C. during several hours. The solid obtained was crushed in an agate mortar to lead to a white powder which was subjected to analysis (IR, XRD, NMR, FEG-SEM). The results demonstrated that the product was synthetic talc.

Example 5

Synthesis of Talc Using Sodium Disilicate (Si/Na=1) with Magnesium Sulfate 22.2 g (0.1 mol) sodium disilicate hydrate was dissolved in 150 mL distilled water in a first beaker (A) under magnetic stirring and ultrasound. In a second beaker (B), 36.93 g (0.15 mol) magnesium sulfate heptahydrate was dissolved in 50 mL deionised water under magnetic stirring and ultrasound. The content of beaker (B) was rapidly added to the content of beaker (A) with manual stirring to obtain a white suspension. The obtained aqueous suspension was treated in a hydrothermal reactor for 96 hours at 300° C. under autogeneous pressure (85 bar). At the end of the hydrothermal treatment, a white gel was obtained, which was washed with distilled water several times. A white paste was obtained which may be dried in an oven at 120° C. during several hours. The solid obtained was crushed in an agate mortar to lead to a white powder which was subjected to analysis (IR, XRD, NMR, FEG-SEM). The results demonstrated that the product was synthetic talc.

Example 6

Synthesis of Willemite Using Sodium Disilicate (Si/Na=1)

Figure 5:
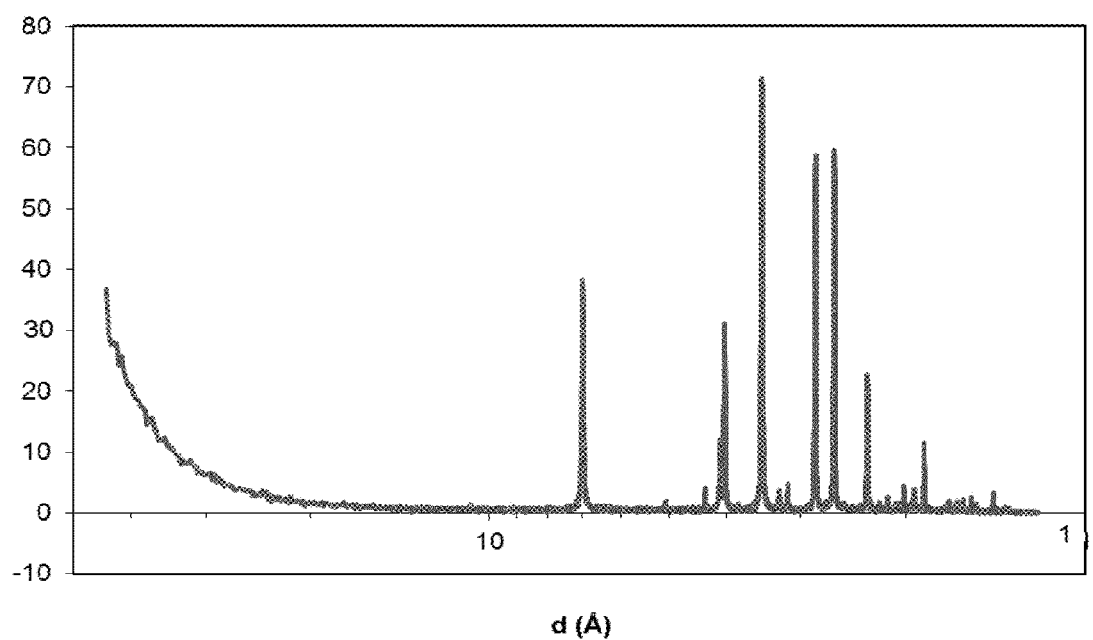
FIG. 5 shows the X-Ray diffractogram of synthetic willemite made by the method of Example 6.

11.10 g (0.05 mol) sodium disilicate hydrate was dissolved in 100 mL distilled water in a first beaker (A) under magnetic stirring and ultrasound. In a second beaker (B), 43.90 g (0.2 mol) zinc acetate dihydrate was dissolved in 200 mL distilled water under magnetic stirring and ultrasound. The content of beaker (B) was rapidly added to the content of beaker (A) with manual stirring to obtain a white suspension. The obtained aqueous suspension was treated in a hydrothermal reactor for 24 hours at 300° C. under autogeneous pressure (85 bar). At the end of the hydrothermal treatment, a white gel was obtained, which was washed with distilled water several times. A white paste was obtained which may be dried in an oven at 120° C. during several hours. The solid obtained was crushed in an agate mortar to lead to a white powder which was subjected to X-Ray diffraction analysis. The results are shown in FIG. 5 and demonstrate that the product of the reaction was synthetic willemite.

Example 7

Synthesis of Talc Using Sodium Metasilicate in Supercritical Conditions

A magnesium acetate solution is first prepared by adding 1.6084 g (0.0075 mol) of magnesium acetate tetrahydrate ($Mg(CH_3COO)_2.4H_2O$) to 250 mL of distilled water. Separately, a sodium metasilicate solution is prepared by adding 2.12 g (0.01 mol) of sodium metasilicate pentahydrate ($Na_2OSiO_2.5H_2O$) to 250 mL of distilled water.

Peristaltic pumps conveyed the two solutions separately via inconel pipes with an outside diameter of ¼ inch (6.35 mm) and an inside diameter of 2.13 mm, and at a flow rate of 4 mL/min each, i.e. a total flow rate of 8 mL/min where the mixing of the two solutions takes place continuously, a few centimetres before the inlet of the reaction pipe. The temperature in the chamber was 400° C., and the pressure in the reaction pipe was maintained (by means of the pressure regulator) around 25 MPa, so that the reaction medium which circulates in the reaction pipe in the chamber was under conditions above the critical point of water (374° C., 221 bar).

The precursor gel, derived from the mixing and precipitation of the two solutions taking place in the third pipe portion upstream of the inlet of the reaction pipe, thus undergoes a hydrothermal treatment at 400° C. in the reaction chamber, which makes it possible to transform this precursor gel into a suspension of synthetic talc. The residence time in the reaction pipe between the inlet and the outlet is 20 seconds.

After cooling, the suspension obtained from the outlet of the reactor is a colloidal suspension of synthetic talc particles in saline aqueous medium (sodium acetate). It has the appearance of a milky white composition which settles over several tens of minutes. A ceramic sinter was used to separate the talc particles by filtering the suspension. After separation, a talc composition, on the one hand, and a supernatant solution especially comprising sodium acetate, on the other hand, the latter then being able to be recovered and optionally recycled, are recovered.

The recovered talc composition after separation is finally dried in an oven at 80° C. for 12 hours.

The product was analysed by XRD. The results demonstrated that the product was synthetic talc.

Example 8

Synthesis of Talc Using a Combination of Sodium Disilicate and Sodium Metasilicate 22.2 g (0.1 mol) sodium disilicate hydrate and 42.42 g (0.2 mol) sodium metasilicate pentahydrate was dissolved in 200 mL distilled water in a first beaker (A) under magnetic stirring and ultrasound. In a second beaker (B), 64.34 g (0.3 mol) magnesium acetate tetrahydrate was dissolved in 100 mL deionised water under magnetic stirring and ultrasound. The content of beaker (B) was rapidly added to the content of beaker (A) with manual stirring to obtain a white suspension. The obtained aqueous suspension was treated in a hydrothermal reactor for 18 hours at 300° C. under autogeneous pressure (85 bar). At the end of the hydrothermal treatment, a white gel was obtained, which was washed with distilled water several times. A white paste was obtained which may be dried in an oven at 120° C. during several hours. The solid obtained was crushed in an agate mortar to lead to a white powder which was subjected to analysis (IR, XRD, NMR, FEG-SEM). The results demonstrated that the product was synthetic talc.

The foregoing broadly describes certain embodiments of the present invention without limitation. Variations and modifications as will be readily apparent to those skilled in the art are intended to be within the scope of the present invention as defined in and by the appended claims.

The invention claimed is:

1. A method for making a synthetic mineral, the method comprising making a synthetic mineral precursor by a precipitation reaction between
   a metal silicate and/or germanate, and
   a divalent or trivalent metal salt,
   wherein the metal silicate and/or germanate comprises a metal disilicate and/or digermanate; and
   wherein the precipitation reaction does not include addition of an acid or a hydroxide base reagent to chemically equilibrate the precipitation reaction.

2. The method of claim 1, wherein the synthetic mineral is a synthetic silicate.

3. The method of claim 1, wherein the metal silicate and/or germanate further comprises a metal metasilicate and/or metagermanate.

4. The method of claim 1, wherein the molar ratio of metal atoms to silicon and/or germanium atoms in the metal silicate and/or germanate is less than about 2.

5. The method of claim 1, wherein the divalent or trivalent metal salt is a magnesium salt or a zinc salt.

6. The method of claim 1, wherein the divalent or trivalent metal salt is not a silicate or germanate salt.

7. The method of claim 1, wherein the divalent or trivalent metal salt is a carboxylate salt, a nitrate salt, a nitrite salt, a sulphate salt, a sulphide salt, a sulphite salt, a bisulphate salt, a bisulfite salt, a halide salt, a carbonate salt, a bicarbonate salt, a chlorate salt, a chromate salt, a dichromate salt, a phosphate salt, a hydroxide salt, a thiosulphate salt, a perchlorate salt, or a combination thereof.

8. The method of claim 1, wherein the precipitation reaction takes place in the presence of a metal carboxylate salt of formula (R-COO)M', wherein R is selected from hydrogen (-H) and alkyl groups comprising less than 5 carbon atoms and M' is a monovalent metal.

9. The method of claim 8, wherein the metal carboxylate salt of formula (R-COO)M' is an acetate salt.

10. The method of claim 8, wherein M' is the same metal as the metal in the metal silicate and/or germanate.

11. The method of claim 8, wherein M' is sodium or potassium.

12. The method of claim 1, wherein the method further comprises a thermal treatment process.

13. The method of claim 12, wherein the thermal treatment process takes place at a temperature equal to or greater than about 100° C. and at a pressure equal to or greater than about 5 bar.

14. The method of claim 12, wherein the thermal treatment process takes place under supercritical conditions.

15. The method of claim 4, wherein the metal silicate and/or germanate comprises sodium disilicate and/or further comprises sodium metasilicate.

16. The method of claim 15, wherein the precipitation reaction takes place in the presence of a metal carboxylate salt of formula (R-COO)M', wherein R is selected from hydrogen (-H) and alkyl groups comprising less than 5 carbon atoms and M' is a monovalent metal.

17. The method of claim 16, wherein the metal carboxylate salt of formula (R-COO)M' is an acetate salt and wherein M' is the same metal as the metal in the metal silicate and/or germanate.

18. The method of claim 17, wherein M' is sodium or potassium.

19. The method of claim 18, wherein the method further comprises a thermal treatment process that takes place at a temperature equal to or greater than about 100° C. and at a pressure equal to or greater than about 5 bar.

* * * * *